(12) United States Patent
Hua et al.

(10) Patent No.: US 9,398,665 B2
(45) Date of Patent: Jul. 19, 2016

(54) CONSTANT CURRENT DRIVE FOR LED LIGHT SOURCE

(71) Applicant: INVENTRONICS (HANGZHOU), INC., Hangzhou, Zhejiang (CN)

(72) Inventors: Guichao Hua, Hangzhou (CN); Delai Jiang, Hangzhou (CN)

(73) Assignee: INVENTRONICS (HANGZHOU), INC., Hangzhou, Zhejiang (CN)

(*) Notice: Subject to any disclaimer, the term of this patent is extended or adjusted under 35 U.S.C. 154(b) by 5 days.

(21) Appl. No.: 14/349,422

(22) PCT Filed: Sep. 28, 2012

(86) PCT No.: PCT/CN2012/082255
§ 371 (c)(1),
(2) Date: Apr. 3, 2014

(87) PCT Pub. No.: WO2013/063996
PCT Pub. Date: May 10, 2013

(65) Prior Publication Data
US 2014/0246987 A1    Sep. 4, 2014

(30) Foreign Application Priority Data

Oct. 31, 2011   (CN) .......................... 2011 1 0338418

(51) Int. Cl.
| | | |
|---|---|---|
| H05B 37/00 | (2006.01) | |
| H05B 39/00 | (2006.01) | |
| H05B 41/14 | (2006.01) | |
| H05B 33/08 | (2006.01) | |
| H05B 41/04 | (2006.01) | |
| H02M 5/45 | (2006.01) | |
| H02M 5/458 | (2006.01) | |

(52) U.S. Cl.
CPC ........ H05B 33/0887 (2013.01); H05B 33/0815 (2013.01); H05B 41/042 (2013.01); Y02B 70/126 (2013.01)

(58) Field of Classification Search
CPC . H05B 41/042; H05B 33/0815; Y02B 70/126
USPC ............. 315/205, 208, 241 R, 200 R; 363/37
See application file for complete search history.

(56) References Cited

U.S. PATENT DOCUMENTS

| | | | |
|---|---|---|---|
| 2009/0091262 A1 | 4/2009 | Takatsuka et al. | |
| 2010/0039794 A1* | 2/2010 | Ghanem et al. | 362/20 |
| 2010/0188021 A1* | 7/2010 | Rugger | 315/307 |

FOREIGN PATENT DOCUMENTS

| | | | |
|---|---|---|---|
| CN | 101754540 A | | 6/2010 |
| CN | 101754540 A | * | 6/2010 |

(Continued)

OTHER PUBLICATIONS

State Intellectual Property Office of People's Republic of China Notification of the First Office Action, dated Jul. 2, 2014, Application No. 201110338418.X.

(Continued)

*Primary Examiner* — Alexander H Taningco
*Assistant Examiner* — Christian L Garcia
(74) *Attorney, Agent, or Firm* — Harness, Dickey & Pierce, P.L.C.

(57) ABSTRACT

Disclosed is a constant current drive for an LED light source, including a main power supply loop and at least one backup power supply loop. The main power supply loop at least includes a power conversion circuit. The power conversion circuit outputs a constant current to an LED light source. The backup power supply loop at least includes a power conversion backup circuit. The power conversion backup circuit outputs a constant current to the LED light source. When the power conversion circuit and the power conversion backup circuit operate normally, any one thereof operates in a nominal state or a derating state, and the output ends thereof are connected in parallel and then supply power to the LED light source simultaneously. When any one of the power conversion circuit and the power conversion backup circuit is invalid, the invalid circuit will not affect the normal operation of the remaining circuit. The constant current drive for an LED light source in the present invention can improve the reliability of the constant current drive for an LED light source due to having a backup power supply loop.

19 Claims, 3 Drawing Sheets

(56) References Cited

FOREIGN PATENT DOCUMENTS

| CN | 201608945 U | 10/2010 |
| CN | 102209415 A | 10/2011 |
| CN | 102802328 A | 11/2012 |

OTHER PUBLICATIONS

International Search Report for PCT/CN2012/082255 (in Chinese with English translation), mailed Jan. 3, 2013; ISA/CN.

* cited by examiner

CONSTANT CURRENT DRIVE FOR LED LIGHT SOURCE

CROSS-REFERENCE TO RELATED APPLICATIONS

This application is the 371 national phase of International Application No. PCT/CN2012/082255, titled "CONSTANT CURRENT DRIVE FOR LED LIGHT SOURCE", filed on Sep. 28, 2012, which claims priority to Chinese patent application No. 201110338418.X, titled "CONSTANT CURRENT DRIVE FOR LED LIGHT SOURCE" and filed with the State Intellectual Property Office on Oct. 31, 2011, the contents of which are hereby incorporated by reference in their entirety.

FIELD OF THE INVENTION

The invention relates to the field of an LED light source driving circuit, and particularly to a constant current driver for an LED light source.

BACKGROUND OF THE INVENTION

LED light sources are applied in more and more situations for its advantages of long lifespan, high lighting efficiency, environmental protection and the like. Since the lifespan of the LED light source is more than 50,000 hours, the main reason for malfunctions of an LED lamp is that a constant current driver for the LED light source becomes invalid. Among the reasons for malfunction of the constant current driver for the LED light source, invalidation of individual semiconductor devices is the most outstanding reason, and the main reason for the invalidation of individual semiconductor devices is that: the LED light source becomes quite hot by itself, and since the constant current driver for the LED light source is generally placed inside the lamp and close to the LED light source, operating characteristics of a semiconductor device are greatly affected by the high-temperature working environment.

In the prior art, one LED lamp is generally equipped with one constant current driver, and the reliability is low. When an LED lamp is turned off due to malfunctions of the constant current driver for the LED light source, there is a need to replace the driver manually, resulting in high maintenance cost, and particularly in some application scenarios. For example, once an LED lamp applied to a tunnel or a road fails and needs to be repaired, it is necessary to block the driveway, bringing inconvenience to the public traffic; further, there is a certain hidden danger in the repairing. Overall, the constant current driver for the LED light source in the prior art has low reliability, resulting in high cost for repairing it.

SUMMARY OF THE INVENTION

An object of the invention is to provide a constant current driver for an LED light source having high reliability, so that the LED light source is kept in operation when a certain element fails.

To achieve the above object, the invention provides solutions as follows.

A constant current driver for an LED light source, including a main power supply loop and at least one backup power supply loop, wherein the main power supply loop includes at least a power conversion circuit, with the power conversion circuit outputting a constant current to the LED light source; the backup power supply loop includes at least a backup power conversion circuit, with the backup power conversion circuit outputting a constant current to the LED light source;

when the power conversion circuit and the backup power conversion circuit are operated normally, each one of the power conversion circuit and the backup power conversion circuit is operated in a rated state or a derated state, and an output terminal of the power conversion circuit and an output terminal of the backup power conversion circuit are connected in parallel to supply power to the LED light source simultaneously; and when any one of the power conversion circuit and the backup power conversion circuit becomes invalid, the invalid circuit does not affect the normal operation of the remaining circuit.

Preferably, an input terminal of the backup power conversion circuit and an input terminal of the power conversion circuit are connected in parallel.

Preferably, the power conversion circuit includes a series-branch consisted of a power factor correction circuit and a constant current circuit, an output terminal of the power factor correction circuit is connected to an input terminal of the constant current circuit, and an output terminal of the constant current circuit is taken as the output terminal of the power conversion circuit and is connected to the LED light source; and an input terminal of the backup power conversion circuit and the input terminal of the constant current circuit are connected in parallel.

Preferably, the power conversion circuit includes a series branch consisted of a power factor correction circuit and a constant current circuit, an output terminal of the power factor correction circuit is connected to an input terminal of the constant current circuit, and an output terminal of the constant current circuit is taken as the output terminal of the power conversion circuit and is connected to the LED light source; alternatively, the power conversion circuit is a single-stage power factor correction circuit.

Preferably, when at least one of the power conversion circuit and the backup power conversion circuit is an isolated circuit, the main power supply loop further includes a rectification circuit, with an output terminal of the rectification circuit being connected to the input terminal of the power conversion circuit;

the backup power supply loop further includes a backup rectification circuit, with an output terminal of the backup rectification circuit being connected to the input terminal of the backup power conversion circuit; and a series branch consisted of the backup rectification circuit and the backup power conversion circuit and a series branch consisted of the rectification circuit and the power conversion circuit are connected in parallel with each other.

Preferably, a breaking device is connected in a branch of the power factor correction circuit where a device having potential short circuit danger is located, when the device is short circuited, the breaking device in the branch where the device is located is disconnected, and after the device in the power factor correction circuit becomes invalid, the constant current driver operates in a non-controlled rectification state without a power factor correction function.

Preferably, when the power factor correction circuit adopts a boost circuit as a main circuit, a first diode (D1) is bridged between an input terminal and an output terminal of the boost circuit, with an anode of the first diode (D1) being connected to the input terminal of the boost circuit and a cathode of the first diode (D1) being connected to the output terminal of the boost circuit.

Preferably, when the power conversion circuit and the backup power conversion circuit are operated normally, the setting operating current of the power conversion circuit is 100% or 50% of its own rated operating current, and the setting operating current of the backup power conversion circuit is 100% or 50% of its own rated operating current.

Preferably, when the setting operating current of at least one of the power conversion circuit and the backup power conversion circuit is lower than its own rated operating current, the constant current driver further includes a current regulation circuit adapted to, when it is determined that one of the power conversion circuit and the backup power conversion circuit becomes invalid, output a signal to the remaining circuit to increase output current of the remaining circuit.

Preferably, the current regulation circuit includes a current detection circuit adapted to detect whether the output current (Io) decreases after the output terminal of the power conversion circuit and the output terminal of the backup power conversion circuit are connected in parallel, and if a detection result of the current detection circuit is 'yes', then the current regulation circuit increases the output current of the power conversion circuit and/or the backup power conversion circuit operated in a derated state to the rated current.

Preferably, a fuse is connected in series in the main power supply loop and a fuse is connected in series in the backup power supply loop.

Preferably, a separation circuit is connected in series in the main power supply loop and a separation circuit is connected in series in the backup power supply loop; when a loop in which the separation circuit is located operates normally, the separation circuit is turned on; and when a loop where the separation circuit is located fails, the separation circuit plays a role in separating the invalid power supply loop from the remaining power supply loop.

Preferably, the separation circuit includes a diode, a semiconductor switching device or a relay.

Preferably, the main power supply loop and the backup power supply loop are packaged in a same case.

According to particular embodiments of the invention, the invention provides the following technical effects:

since there is a backup power supply loop in the constant current driver for the LED light source of the invention, when the main power supply loop of the constant current driver fails, the backup power supply loop can still keep supplying power to the LED light source to make the LED light source operate normally, thereby the reliability of the constant current driver for the LED light source is improved;

further, the backup power supply loop can be taken as back up for a circuit in the main power supply loop which contains semiconductor, i.e., local backup, and since the local backup has a low cost, it is able to significantly improve the reliability of the whole LED driver while reducing the backup cost; and finally, the main power supply loop and the backup power supply loop are packaged together to share a same case, structural members and PCBs are reduced, and further device cost and production cost are saved.

BRIEF DESCRIPTION OF THE DRAWINGS

In order to more clearly illustrate the technical solutions in embodiments of the invention or in the prior art, in the following, accompanying drawings referred to describe the embodiments are introduced simply. Obviously, the accompanying drawings in the following description are just some embodiments of the invention. For those skilled in the art, other accompanying drawings can also be obtained based on these accompanying drawings provided herein without any creative work.

DETAILED DESCRIPTION OF THE INVENTION

In the following, the technical solutions in the embodiments of the invention will be described clearly and completely in conjunction with the accompanying drawings in the embodiments of the invention. Obviously, the described embodiments are just a part of embodiments of the invention, rather than all embodiments. Based on the embodiments of the invention, all other embodiments obtained by those skilled in the art without any creative work will fall within the scope of protection of the invention.

To make the above objects, features and advantages of the invention more obvious and easy to be understood, in the following, the invention will be further illustrated in detail in conjunction with the accompanying drawings and particular embodiments.

Figure 1:
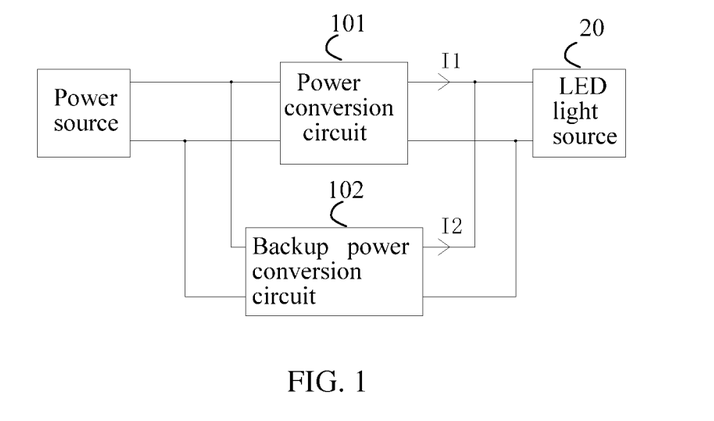
FIG. 1 is a structural diagram of a constant current driver for an LED light source according to an embodiment 1 of the invention.

FIG. 1 is a structural diagram of a constant current driver for an LED light source according to an embodiment 1 of the invention. As shown in FIG. 1, the constant current driver includes a main power supply loop and at least one backup power supply loop, wherein the main power supply loop includes at least a power conversion circuit 101, with the power conversion circuit 101 outputting a constant current to the LED light source 20;

the backup power supply loop includes at least a backup power conversion circuit 102, with the backup power conversion circuit 102 outputting a constant current to the LED light source 20;

when the power conversion circuit 101 and the backup power conversion circuit 102 are operated normally, each one of the power conversion circuit 101 and the backup power conversion circuit 102 is operated in a rated state or a derated state, and an output terminal of the power conversion circuit 101 and an output terminal of the backup power conversion circuit 102 are connected in parallel to supply power to the LED light source 20 simultaneously; and when any one of the power conversion circuit and the backup power conversion circuit becomes invalid, the invalid circuit does not affect the normal operation of the remaining circuit.

Outputting a constant current by the power conversion circuit and the backup power conversion circuit refers to that the output current thereof which may carry a ripple wave is controlled.

The rated state here refers to that the output current of the power conversion circuit and the output current of the backup power conversion circuit are rated current.

The derated state is a state relative to the rated state, and here refers to that the output current of the power conversion circuit and the output current of the backup power conversion circuit are less than the rated current.

In the embodiment, an input terminal of the backup power conversion circuit 102 and an input terminal of the power conversion circuit 101 are connected in parallel.

Next, the operating principle of the constant current driver for the LED light source of the invention is introduced as follows:

when the main power supply loop is operated normally, the backup power supply loop supplies power to the LED load together with the main power supply loop since the backup power supply loop and the main power supply loop are connected in parallel, which is equivalent to a case that two constant current sources are connected in parallel; and when the main power supply loop is unable to output current due to malfunction, the backup power supply loop is still operated normally and outputs current to supply power to the LED load.

Now the operating state of the backup power supply loop is illustrated by way of an example. Assuming that the backup power supply loop includes a backup power conversion circuit, and the backup power conversion circuit is connected in parallel across the power conversion circuit of the main power supply loop:

when the main power supply loop is operated normally, each of the power conversion circuit and the backup power conversion circuit may output 50% of the LED's load current Io, respectively; and when the main power supply loop is unable to output current due to malfunction, the current value of the LED load is the current output by the backup power conversion circuit, and the current value is 50% Io. Of course, at this time, the output current of the backup power conversion circuit may be increased by adjusting reference of the output current loop of the backup power conversion circuit. Once the main power supply loop becomes invalid, the output current of the backup power supply loop is increased from the original 50% Io to rated output 100% Io, or 70%-80% Io. In this way, no matter whether the main power supply loop becomes invalid, the load current of the LED can always be maintained at a large output current.

It should be noted that, the main power supply loop and the backup power supply loop are relative to each other, and the above description is made for an assumption that the main power supply becomes invalid at first. In practice, when the backup power supply loop becomes invalid at first, the main power supply loop functions as a "backup".

Further, when the power conversion circuit and the backup power conversion circuit are operated normally, the setting operating current of the power conversion circuit may be 100% or 50% of its own rated operating current, and the setting operating current of the backup power conversion circuit may be 100% or 50% of its own rated operating current.

In summary, since there is a backup power supply loop in the constant current driver for the LED light source of the invention, when the main power supply loop of the constant current driver fails, the backup power supply loop can still keep supplying power to the LED light source to make the LED light source operate normally, thereby the reliability of the constant current driver for the LED light source is improved.

In practical application, the power conversion circuit may be implemented in many ways. For example, the power conversion circuit includes a series branch consisted of a power factor correction circuit and a constant current circuit, an output terminal of the power factor correction circuit is connected to an input terminal of the constant current circuit, and an output terminal of the constant current circuit is taken as the output terminal of the power conversion circuit and is connected to the LED light source; alternatively, the power conversion circuit is a single-stage power factor correction circuit.

In practical application, the backup power supply loop may also be implemented in many ways.

Figure 2:
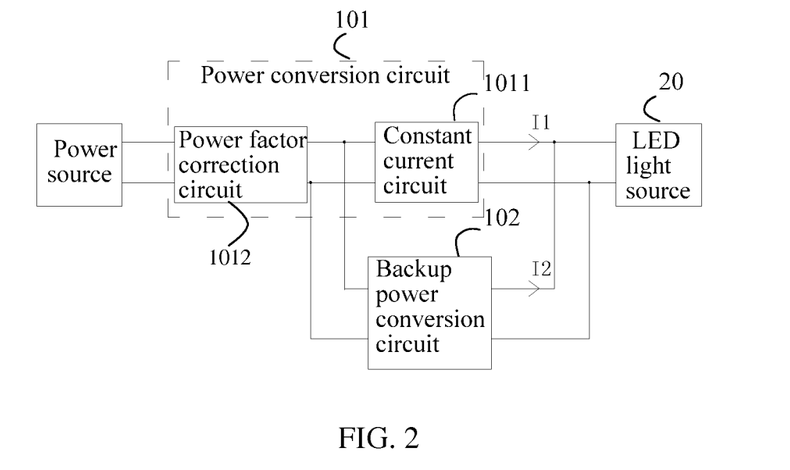
FIG. 2 is a structural diagram of a constant current driver for an LED light source according to an embodiment 2 of the invention.

FIG. 2 is a structural diagram of a constant current driver for an LED light source according to an embodiment 2 of the invention. As shown in FIG. 2, the constant current driver includes:

a power conversion circuit 101 and a backup power conversion circuit 102;

the power conversion circuit 101 includes a series branch consisted of a power factor correction circuit 1012 and a constant current circuit 1011, with an output terminal of the power factor correction circuit 1012 being connected to an input terminal of the constant current circuit 1011, and an output terminal of the constant current circuit 1011 is taken as the output terminal of the power conversion circuit 101 and is connected to the LED light source 20; and an input terminal of the backup power conversion circuit 102 and the input terminal of the constant current circuit 1011 are connected in parallel.

The embodiment adopts a local backup way. In the embodiment, the backup power conversion circuit 102 is mainly taken as back up for the constant current circuit 1011. When the constant current circuit 1011 becomes invalid, since the backup power conversion circuit 102 may be operated, the constant current driver can still be used.

It should be noted that, in the embodiment, a breaking device is connected in a branch of the power factor correction circuit where a device having potential short circuit danger is located. After the device in the power factor correction circuit becomes invalid, the constant current driver is operated in a non-controlled rectification state without a power factor correction function. When a device in the branch where the breaking device is located is short circuited, the breaking device is disconnected. The breaking device may be a rapid fuse.

The local backup way disclosed in the embodiment improves the reliability of the constant current driver in addition to saving a certain cost.

Figure 3:
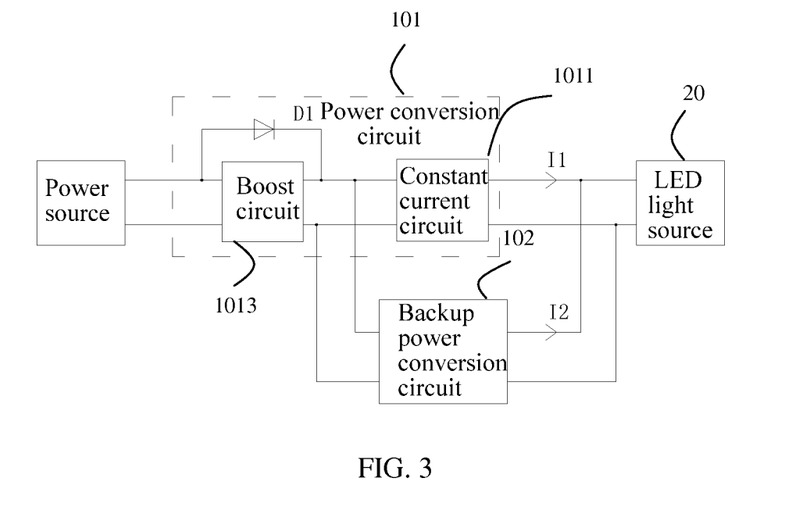
FIG. 3 is a structural diagram of a constant current driver for an LED light source according to an embodiment 3 of the invention.

FIG. 3 is a structural diagram of a constant current driver for an LED light source according to an embodiment 3 of the invention. The embodiment shown in FIG. 3 mainly differs from the embodiment shown in FIG. 2 is that, when the power factor correction circuit 1012 adopts a boost circuit 1013 as a main circuit, a diode D1 is bridged between an input terminal and an output terminal of the boost circuit, with an anode of the D1 being connected to the input terminal of the boost circuit 1013, and a cathode of the D1 being connected to the output terminal of the boost circuit 1013. When the boost circuit 1013 is operated normally, since an output voltage of the boost circuit 1013 is more than an input voltage of the boost circuit 1013, and the output voltage of the boost circuit 1013 is substantially unchanged, the diode D1 is subjected to a reverse voltage drop. According to the unilateral conductivity of a diode, the D1 does not provide a current path and the boost circuit 1013 implements a power factor correction function; and when the boost circuit fails, a path is provided since the two terminals of the D1 are subjected to an open-circuit voltage of the boost circuit, therefore, the constant current driver is operated in a non-controlled rectification state without a power factor correction function.

Figure 4:
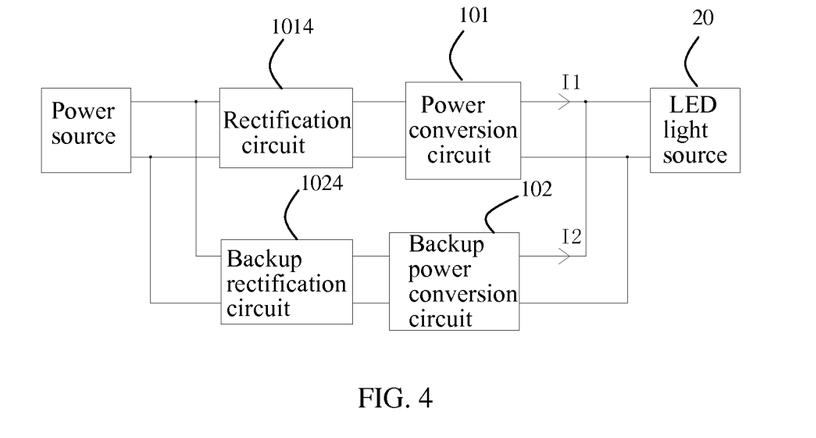
FIG. 4 is a structural diagram of a constant current driver for an LED light source according to an embodiment 4 of the invention.

FIG. 4 is a structural diagram of a constant current driver for an LED light source according to an embodiment 4 of the invention. When at most one of the power conversion circuit and the backup power conversion circuit is a non-isolated circuit, as shown in FIG. 4, the main power supply loop further includes a rectification circuit 1014, with an output terminal of the rectification circuit 1014 being connected to the input terminal of the power conversion circuit 1011;

the backup power supply loop further includes a backup rectification circuit 1024, with an output terminal of the backup rectification circuit 1024 being connected to the input terminal of the backup power conversion circuit 102; and a series branch consisted of the backup rectification circuit 1024 and the backup power conversion circuit 102 and a series branch consisted of the rectification circuit 1014 and the power conversion circuit 101 are connected in parallel.

It should be noted that, the premise of the embodiment is that at most one of the power conversion circuit and the backup power conversion circuit is a non-isolated circuit. The reason is that, if both the power conversion circuit and the backup power conversion circuit are non-isolated circuits, that is, they are commonly grounded, when the rectification circuit becomes invalid due to short circuit, the backup rectification circuit will also be short circuited and can not serve as a backup. That is, when both the power conversion circuit and the backup power conversion circuit have a non-isolated switching power supply topology, the backup power supply loop does not include a backup rectification circuit. It should be noted that, when the constant current driver for the LED light source includes multiple backup power supply loops, at most one of the power conversion circuit and the multiple backup power conversion circuits is a non-isolated circuit.

Figure 5:
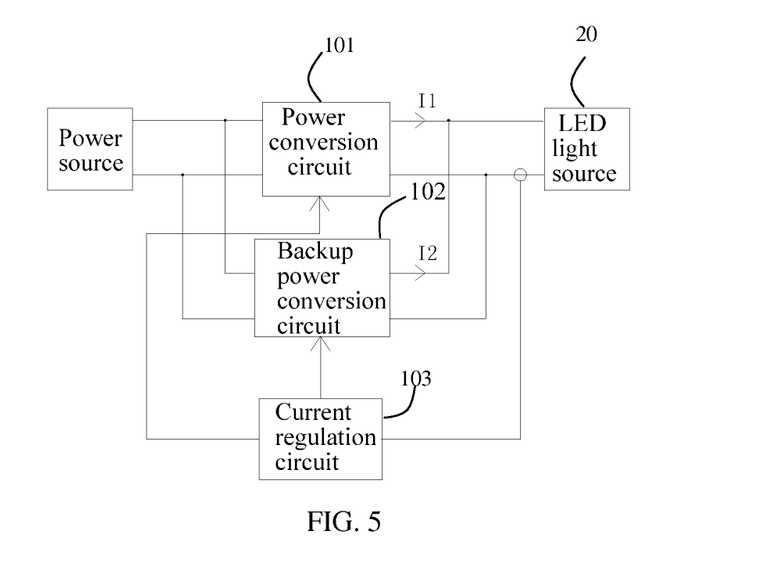
FIG. 5 is a structural diagram of a constant current driver for an LED light source according to an embodiment 5 of the invention.

FIG. 5 is a structural diagram of a constant current driver for an LED light source according to an embodiment 5 of the invention. When at least one of the power conversion circuit and the backup power conversion circuit is operated in a derated state (i.e., the setting operating current is less than its own rated operating current), as shown in FIG. 5, the constant current driver further includes a current regulation circuit 104 adapted to, when one of the power conversion circuit and the backup power conversion circuit becomes invalid, output a signal to the remaining circuit and increase output current of the remaining circuit. By detecting the value of the output current after the power conversion circuit and the backup power conversion circuit are connected in parallel, the current regulation circuit 104 may determine that one of the power conversion circuit and the backup power conversion circuit is invalid when it is detected that the output current decreases, the current regulation circuit 104 may output a signal to the power conversion circuit 101 and/or the backup power conversion circuit 102 which are operated in a derated state, to increase the output current thereof to min(the rated current, I1+I2), where I1 is the output current of the power conversion circuit, and I2 is the output current of the backup power conversion circuit; and finally, the input current of the LED light source will not have a great change due to the invalidation of a pre-stage circuit.

Specifically, the current regulation circuit 104 may include a current detection circuit adapted to detect whether the output current (Io) after the output terminal of the power conversion circuit and the output terminal of the backup power conversion circuit are connected in parallel decreases, and if a detection result of the current detection circuit is 'yes', then the current regulation circuit increases the output current of the power conversion circuit and/or the backup power conversion circuit which are operated in a derated state to the rated current.

An output terminal of the current regulation module is connected to a current loop or a dimming line of the power conversion circuit and/or the backup power conversion circuit, to increase the output current.

It should be noted that, the constant current driver for the LED light source in the invention may include one backup power supply loop, and may also include multiple backup power supply loops. When multiple backup power supply loops are included in the constant current driver, individual backup power supply loops may be the same or different. For example, a first backup power supply loop may only include a backup power conversion circuit, and a second backup power supply loop may include a backup rectification circuit and a backup power conversion circuit which are connected in series.

In the backup power supply loop, the number of the backup power conversion circuits may be one, and may also be more than one. When there are multiple backup power conversion circuits, the multiple backup power conversion circuits are connected in parallel.

Specifically, the backup power supply loop may include two backup power conversion circuits which are connected in parallel. When both the power conversion circuit of the main power supply loop and one backup power conversion circuit fail, the remaining backup power conversion circuit can still be operated normally. In this way, the failure rate of the constant current driver for the LED light source may be further reduced, thereby improving the reliability thereof.

In conclusion, the number of the same kind of backup circuits in the backup power supply loop is not limited in the invention. The more the number of the same backup circuits is set, the high the circuit reliability of the constant current driver for the LED light source will become.

When the solutions of the invention are implemented specifically, the rectification circuit and the backup rectification circuit may adopt the same circuits, and may also adopt different circuits, as long as a condition of converting the input alternative current into a pulsating direct current is satisfied. The power conversion circuit and the backup power conversion circuit may adopt the same switching power supply topologies, and may also adopt different switching power supply topologies, as long as a condition of converting the pulsating direct current into a constant output current is satisfied.

In practical application, the power conversion circuit may be a single-stage circuit, and may also be a multistage circuit; the backup power conversion circuit may be a single-stage circuit or a multistage circuit; and the constant current circuit may be a single-stage circuit, and may also be a multistage circuit.

In practical application, in order to ensure that, when a power supply loop fails, the normal operation of the remaining power supply loop is not affected, a separation circuit may further be connected in series in the main power supply loop and a separation circuit may further be connected in series in the backup power supply loop. When a loop where the separation circuit is located is operated normally, the separation circuit is turned on; and when a loop where the separation circuit is located fails, the separation circuit plays a role in separating the invalid power supply loop from the remaining power supply loop.

The separation circuit may be a fuse or a diode, and may also be a semiconductor switching device, a relay or any other controllable device. The semiconductor switching device may be a MOS transistor, a triode, an IGBT (Insulated Gate Bipolar Transistor) or the like.

When the separation circuit adopts a fuse, a rapid fuse may be further selected. Once a short circuit malfunction occurs in a certain branch of a certain power supply loop, the fuse connected in series in the branch is fused to disconnect the short circuited branch, without affecting the normal operation of the remaining power supply loop.

When the separation circuit adopts a diode, the unidirectional conductivity of the diode is utilized to achieve separation in a current direction from a cathode of the diode to an anode of the diode.

When the separation circuit is a semiconductor switching device, a relay or any other controllable device, the separation is achieved by controlling the semiconductor switching device, the relay or the any other controllable device to be turned off. The controlled device is controlled to be turned on or turned off depending on the controlled terminal thereof (for example, the gate of a MOS transistor). Therefore, a driving circuit of the controlled terminal receives a notification signal that the loop where the controlled device is located is invalid.

For example, a current output terminal of the main power supply loop and a current output terminal of the backup power supply loop are connected after being connected in series with a diode respectively. The backup power supply loop may have any of the above circuit structures, which is not defined here.

Figure 6:
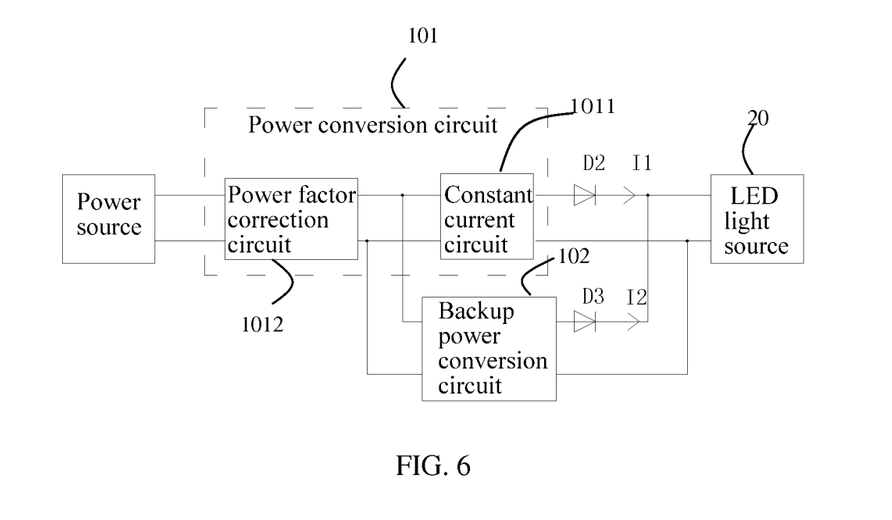
FIG. 6 is a structural diagram of a constant current driver for an LED light source according to an embodiment 6 of the invention.

FIG. 6 is a structural diagram of a constant current driver for an LED light source according to an embodiment 6 of the invention. As shown in FIG. 6, in the embodiment, the separation circuit is a diode. An anode of the isolation diode D2 is connected to the current output terminal of the power conversion circuit 101, and a cathode of the isolation diode D2 is connected to an anode of the LED light source 20. An anode of the isolation diode D3 is connected to the current output terminal of the backup power conversion circuit 102, and a cathode of the isolation diode D3 is connected to the anode of the LED light source 20. The circuit connection mode in the embodiment can ensure that, after a branch becomes invalid, the remaining power supply loop may be operated normally. For example, when the power conversion circuit 101 is unable to output current due to malfunction, since the output terminal of the power conversion circuit 101 is connected with the output terminal of the backup power conversion circuit 102 via the isolation diode D2, the normal operation of the backup power conversion circuit 102 can not be affected. When the output terminal of the power conversion circuit 101 is short circuited, the output terminal of the backup power conversion circuit 102 will not be short circuited due to the unidirectional conductivity of the isolation diode D2, thereby the backup power conversion circuit 102 is ensured to be operated normally.

In practical application, the input terminal of the rectification circuit may further be connected with an electromagnetic interference suppressing circuit, with an input terminal of the electromagnetic interference suppressing circuit being connected to the alternative current. The electromagnetic interference suppressing circuit can suppress interference of external electromagnetic field or electromagnetic wave on the constant current driver.

In practical application, all elements of the constant current driver for the LED light source of the invention may be integrally packaged in one case. That is, the main power supply loop and the backup power supply loop are packaged in a same case. Since one case is shared, structural members and PCBs are reduced, and device cost and production cost may be further saved. The main power supply loop and each backup power supply loop may be packaged separately.

Individual embodiments in the specification are described in a progressive manner, with the emphasis of each of the embodiments placed on the difference between it and the other embodiments; hence, for the same or similar parts between the embodiments, one can refer to the other embodiments.

Particular examples are utilized herein to illustrate the principle and embodiments of the invention, and the above description of the embodiments is just used to aid the reader in understanding the method of the invention and the core concept thereof. Also, for those skilled in the art, modifications may be made to the particular embodiments and the application scope according to the concept of the invention. In summary, the content of the specification should not be interpreted as limiting the invention.

The invention claimed is:

1. A constant current driver for an LED light source, comprising a main power supply loop and at least one backup power supply loop, wherein the main power supply loop at least comprises a power conversion circuit, the power conversion circuit outputs a constant current to the LED light source;

the backup power supply loop at least comprises a backup power conversion circuit, the backup power conversion circuit outputs a constant current to the LED light source;

when the power conversion circuit and the backup power conversion circuit are operated normally, each one of the power conversion circuit and the backup power conversion circuit is operated in a rated state or a derated state, and an output terminal of the power conversion circuit and an output terminal of the backup power conversion circuit are connected in parallel to supply power to the LED light source simultaneously; and when any one of the power conversion circuit and the backup power conversion circuit becomes invalid, the invalid circuit does not affect the normal operation of the remaining circuit;

wherein when the setting operating current of at least one of the power conversion circuit and the backup power conversion circuit is lower than its own rated operating current, the constant current driver further comprises a current regulation circuit adapted to output a signal to the remaining circuit and increase output current of the remaining circuit, when it is determined that one of the power conversion circuit and the backup power conversion circuit is invalid.

2. The constant current driver according to claim 1, wherein an input terminal of the backup power conversion circuit and an input terminal of the power conversion circuit are connected in parallel.

3. The constant current driver according to claim 1, wherein the power conversion circuit comprises a series branch including a power factor correction circuit and a constant current circuit, an output terminal of the power factor correction circuit is connected to an input terminal of the constant current circuit, and an output terminal of the constant current circuit is taken as the output terminal of the power conversion circuit and is connected to the LED light source; and an input terminal of the backup power conversion circuit and the input terminal of the constant current circuit are connected in parallel.

4. The constant current driver according to claim 2, wherein the power conversion circuit comprises a series branch including a power factor correction circuit and a constant current circuit, an output terminal of the power factor correction circuit is connected to an input terminal of the constant current circuit, and an output terminal of the constant current circuit is taken as the output terminal of the power conversion circuit and is connected to the LED light source; alternatively, the power conversion circuit is a single-stage power factor correction circuit.

5. The constant current driver according to claim 1, wherein when at most one of the power conversion circuit and the backup power conversion circuit is a non-isolated circuit, the main power supply loop further comprises a rectification circuit, an output terminal of the rectification circuit is connected to the input terminal of the power conversion circuit;

the backup power supply loop further comprises a backup rectification circuit, with an output terminal of the backup rectification circuit being connected to the input terminal of the backup power conversion circuit; and a series branch including the backup rectification circuit and the backup power conversion circuit and a series branch including of the rectification circuit and the power conversion circuit are connected in parallel.

6. The constant current driver according to claim 3, wherein a breaking device is connected in a branch of the power factor correction circuit where a device having potential short circuit danger is located, when the device is short circuited, the breaking device in the branch where the device is located is disconnected, and after the device in the power factor correction circuit becomes invalid, the constant current driver is operated in a non-controlled rectification state without a power factor correction function.

7. The constant current driver according to claim 3, wherein when the power factor correction circuit comprises a boost circuit as a main circuit, a first diode (D1) is bridged between an input terminal and an output terminal of the boost circuit, with an anode of the first diode (D1) being connected to the input terminal of the boost circuit and a cathode of the first diode (D1) being connected to the output terminal of the boost circuit.

8. The constant current driver according to claim 1, wherein when the power conversion circuit and the backup power conversion circuit are operated normally, the setting operating current of the power conversion circuit is 100% or 50% of its own rated operating current, and the setting operating current of the backup power conversion circuit is 100% or 50% of its own rated operating current.

9. The constant current driver according to claim 1, wherein the current regulation circuit comprises a current detection circuit adapted to detect whether the output current (Io) after the output terminal of the power conversion circuit and the output terminal of the backup power conversion circuit are connected in parallel decreases, and if a detection result of the current detection circuit is 'yes', then the current regulation circuit increases the output current of the power conversion circuit and/or the backup power conversion circuit which are operated in a derated state to the rated current.

10. The constant current driver according to claim 1, wherein a separation circuit is connected in series in the main power supply loop and a separation circuit is connected in series in the backup power supply loop; when a loop where the separation circuit is located is operated normally, the separation circuit is turned on; and when a loop where the separation circuit is located fails, the separation circuit plays a role in separating the invalid power supply loop from the remaining power supply loop.

11. The constant current driver according to claim 10, wherein the separation circuit comprises a fuse, a diode, a semiconductor switching device or a relay.

12. The constant current driver according to claim 1, wherein the main power supply loop and the backup power supply loop are packaged in a same case.

13. The constant current driver according to claim 2, wherein when at most one of the power conversion circuit and the backup power conversion circuit is a non-isolated circuit, the main power supply loop further comprises a rectification circuit, an output terminal of the rectification circuit is connected to the input terminal of the power conversion circuit;

the backup power supply loop further comprises a backup rectification circuit, with an output terminal of the backup rectification circuit being connected to the input terminal of the backup power conversion circuit; and a series branch including the backup rectification circuit and the backup power conversion circuit and a series branch including the rectification circuit and the power conversion circuit are connected in parallel.

14. The constant current driver according to claim 4, wherein when at most one of the power conversion circuit and the backup power conversion circuit is a non-isolated circuit, the main power supply loop further comprises a rectification circuit, an output terminal of the rectification circuit is connected to the input terminal of the power conversion circuit;

the backup power supply loop further comprises a backup rectification circuit, with an output terminal of the backup rectification circuit being connected to the input terminal of the backup power conversion circuit; and a series branch the backup rectification circuit and the backup power conversion circuit and a series branch including the rectification circuit and the power conversion circuit are connected in parallel.

15. The constant current driver according to claim 6, wherein when the power factor correction circuit adopts a boost circuit as a main circuit, a first diode (D1) is bridged between an input terminal and an output terminal of the boost circuit, with an anode of the first diode (D1) being connected to the input terminal of the boost circuit and a cathode of the first diode (D1) being connected to the output terminal of the boost circuit.

16. The constant current driver according to claim 2, wherein when the power conversion circuit and the backup power conversion circuit are operated normally, the setting operating current of the power conversion circuit is 100% or 50% of its own rated operating current, and the setting operating current of the backup power conversion circuit is 100% or 50% of its own rated operating current.

17. The constant current driver according to claim 3, wherein when the power conversion circuit and the backup power conversion circuit are operated normally, the setting operating current of the power conversion circuit is 100% or 50% of its own rated operating current, and the setting operating current of the backup power conversion circuit is 100% or 50% of its own rated operating current.

18. The constant current driver according to claim 4, wherein when the power conversion circuit and the backup power conversion circuit are operated normally, the setting operating current of the power conversion circuit is 100% or 50% of its own rated operating current, and the setting operating current of the backup power conversion circuit is 100% or 50% of its own rated operating current.

19. The constant current driver according to claim 5, wherein when the power conversion circuit and the backup power conversion circuit are operated normally, the setting operating current of the power conversion circuit is 100% or 50% of its own rated operating current, and the setting operating current of the backup power conversion circuit is 100% or 50% of its own rated operating current.

\* \* \* \* \*